Patented July 4, 1933

1,916,743

UNITED STATES PATENT OFFICE

ERWIN SCHWENK, MAX GEHRKE, AND FRANZ AICHNER, OF BERLIN, GERMANY, ASSIGNORS TO SCHERING-KAHLBAUM A.-G., OF BERLIN, GERMANY

PRODUCTION OF ACROLEIN

No Drawing. Application filed June 7, 1930, Serial No. 459,825, and in Germany June 15, 1929.

Our invention refers to an improvement in the production of acrolein.

As it is well known acrolein can be obtained by thermic decomposition of glycerine in the presence of dehydrating agents, such as acid sulphates (as for instance potassium bisulphate) or phosphorus pentoxide. The yields obtainable by this process are very low and do not exceed 20% of the thoretical quantity. Wohl (Berichte der deutschen chemischen Gesellschaft vol. 45, S. 2046) improved this process by passing evaporated glycerine over magnesium sulphate but obtained only yields of 30% of the theory.

We have found that the yields can be highly increased if the evaporated glycerine is passed over salts of acids which are more than bibasic or mixtures thereof. These salts which are preferably precipitated on carriers as for instance pumice stone, are heated in tubes at temperatures of about 300–600° C.

If evaporated glycerine is conveyed through these tubes, acrolein is obtained in almost theoretical quantity. By distilling from the recipient over a dephlegmator the pure product is immediately obtained.

It is noticeable that the product thus obtained, shows a much lower tendency to polymerize than the product obtained according to processes which hitherto have been known.

A further advantage of the process here described is, that aqueous glycerine can be used as starting material, whilst hitherto highly dehydrated glycerine was necessary for the production of acrolein.

Example 1

Pumice stone diminuted to the size of peas is impregnated with a 1% solution of lithium phosphate ($Li_3PO_4$). After drying the catalyst is filled into a tube, which in an electric furnace can be heated to about 400–420° C. By passing vapors of glycerine through the tube a mixture of water, acrolein and other substances is obtained, from which by fractional distillation acrolein can be isolated in an amount of 75% of the theoretical quantity.

Example 2

By using copper phosphate for the production of the catalyst according to the process described in Example 1 and passing the vapors of a glycerine of 50% water content through the tube acrolein is obtained in an amount of 80% of the theory.

Various changes may be made in the details disclosed in the foregoing specification without departing from the invention or sacrificing the advantages thereof.

We claim:—

1. The process for the production of acrolein comprising passing the vapors of glycerine at a temperature of about 300–600° C. over phosphates, of elements included in group 1 of the periodic system.

2. The process for the production of acrolein comprising passing the vapors of glycerine at a temperature of about 300–600° C. over phosphates, of elements included in group 1 of the periodic system which are precipitated on a carrier.

3. The process for the production of acrolein comprising passing the vapors of glycerine at a temperature of about 300–600° C. over phosphates, of elements included in group 1 of the periodic system which are precipitated on pumice stone.

4. The process for the production of acrolein comprising passing the vapors of glycerine at a temperature of about 300–600° C. over copper phosphates.

5. The process for the production of acrolein comprising passing the vapors of glycerine at a temperature of about 300–600° C. over copper phosphate which is precipitated on a carrier.

6. The process for the production of acrolein comprising passing the vapors of glycerine at a temperature of about 300–600° C. over copper phosphate which is precipitated on pumice stone.

7. The process for the production of acrolein comprising passing the vapors of watery glycerine at a temperature of about 300–600° C. over phosphates, of elements included in group 1 of the periodic system.

8. The process for the production of acrolein comprising passing the vapors of watery glycerine at a temperature of about 300-600° C. over phosphates, of elements included in group 1 of the periodic system which are precipitated on a carrier.

9. The process for the production of acrolein comprising passing the vapors of watery glycerine at a temperature of about 300-600° C. over phosphates, of elements included in group 1 of the periodic system which are precipitated on pumice stone.

10. The process for the production of acrolein comprising passing the vapors of watery glycerine at a temperature of about 300-600° C. over copper phosphate.

11. The process for the production of acrolein comprising passing the vapors of watery glycerine at a temperature of about 300-600° C. over copper phosphate which is precipitated on a carrier.

12. The process for the production of acrolein comprising passing the vapors of watery glycerine at a temperature of about 300-600° C. over copper phosphate which is precipitated on pumice stone.

13. The process for the production of acrolein comprising passing the vapors of glycerine with a water content of about 50% at a temperature of about 400-420° C. over copper phosphate which is precipitated on pumice stone.

14. The process for the production of acrolein comprising passing the vapors of glycerine at a temperature of about 300-600° C. over phosphates of elements selected from a group consisting of lithium and copper.

15. The process for the production of acrolein comprising passing the vapors of glycerine at a temperature of about 300-600° C. over lithium phosphate.

ERWIN SCHWENK.
MAX GEHRKE.
FRANZ AICHNER.